United States Patent [19]

Stayton et al.

[11] 3,956,453

[45] May 11, 1976

[54] PROCESS FOR FABRICATING ONE-PIECE ROCKET MOTOR HEAT BARRIER

[75] Inventors: Leroy M. Stayton; William H. Thielbahr; James C. Connelly, all of Ridgecrest, Calif.

[73] Assignee: The United States of America as represented by the Secretary of the Navy, Washington, D.C.

[22] Filed: Dec. 3, 1973

[21] Appl. No.: 421,307

[52] U.S. Cl. ............................... 264/219; 264/221; 264/317; 264/318; 264/328; 264/331
[51] Int. Cl.² ..................... B29C 1/08; B29D 1/00; B29G 3/00
[58] Field of Search ........... 264/219, 221, 274, 317, 264/102, 328, 329, 299, 319, 331, 259, 268, 334, 337, 318

[56] References Cited
UNITED STATES PATENTS

| | | | |
|---|---|---|---|
| 1,353,942 | 9/1920 | Akin | 425/178 |
| 2,079,393 | 5/1937 | Benge | 425/DIG. 12 |
| 2,203,421 | 6/1940 | Stevenson et al. | 264/317 |
| 2,408,629 | 10/1946 | Green | 264/329 |
| 2,517,902 | 8/1950 | Luebkeman | 264/317 |
| 3,435,107 | 3/1969 | Conrad | 264/274 |
| 3,780,151 | 12/1973 | Heier | 264/102 |

OTHER PUBLICATIONS

Randolph et al., Plastics Engineering Handbook, Reinhold, N.Y., (1960) pp. 10 and 11.

*Primary Examiner*—Willard E. Hoag
*Attorney, Agent, or Firm*—R. S. Sciascia; Roy Miller; Robert F. Beers

[57] ABSTRACT

A method for molding one piece seamless contoured structures. The mold consists of a hollow, cylindrical mold member whose internal surface area defines the external surface of the piece to be molded, that is adaptive to receive a piston having a reservoir containing a fluid plastic and a mandrel mold member of low melting alloy whose shape defines the internal surface of the molded structure. The piston is forced upward to cause the fluid plastic to flow into the interstices and allowed to cure. Heat is applied to the mold assembly to melt the alloy to allow removal of the contoured structure when the mold assembly is disassembled.

3 Claims, 3 Drawing Figures

PROCESS FOR FABRICATING ONE-PIECE ROCKET MOTOR HEAT BARRIER

BACKGROUND OF THE INVENTION

1. Field of Invention

This invention relates to a method of molding seamless one piece contour shaped chamber-like structures.

2. Background of Invention

Manufacture of molded containers especially ones with complicated curvatures requires complex molding and fabrication techniques. This is especially the case where the requirements are for a seamless, one piece container-like structure that has a throatlike opening that is of smaller diameter than the diameter of the interior of the container. Even more difficult is casting a container that has a number of different diameters along its longitudinal axis such as an hour glass shape or the like or a container having an irregular shape.

Due to the rapid growth of the missile and space craft fields many articles for these devices require chamber like containers that can be simply and economically fabricated. Many of these containers are used in high temperature environments such as in the rocket combustion chamber and throat area of the rocket nozzle to provide high temperature insulation for the external surfaces for these parts.

Prior art attempts to solve this problem has involved molding several portions of the desired article such as the body member and throat member and joining them together by some means into a smooth uniform joint. The process is necessarily complex and requires separate molding of each member. Other prior art techniques use molding assemblies that operate to apply pressure between two mold members to force ribbon or tape like thermosettable resin placed on a mold surface into dome like or conical members to provide molded articles for missiles and rockets. These techniques have the disadvantage of only being able to produce articles that has an egress opening that is of a larger diameter than the diameter of the body member. This sort of structure is necessary in order to remove the male mold member from the formed article.

SUMMARY OF THE INVENTION

An object of the invention is to provide a method of producing molded articles that can be compression molded to form seamless one piece articles with an elongated throat like opening.

These and other objects herein after defined are met by the present invention which relates to a method of producing molded contoured, seamless one-piece heat insulative cylindrical liners for utilization in solid, air breathing and uncooled liquid propellant combustion chambers by the utilizing castable type insulating materials. A mandrel of low melting lead-bismuth alloy or other suitable melting or dissolvable material is first cast around a light weight alloy core. The mandrel is formed in a casting mold whose internal surface area defines the external shape of the piece to be molded. The casting mold is adaptive at one end to attach a piston having a hollowed out face forming a reservoir chamber for holding the fluid plastic insulating material used for forming the liner. The insulating material is placed in the reservoir of the piston and placed in a vacuum degassing chamber. The mold is assembled and the piston is forced to travel a predetermined amount to cause the fluid plastic to flow in the interstices of the mold. The fluid plastic is allowed to cure. After sufficient curing the entire mold is placed in a heat chamber and the low alloy material is melted and removed. The mold is cooled and disassambled to remove the molded liner.

DESCRIPTION OF THE PREFERRED EMBODIMENT OF THE INVENTION

Figure 1:
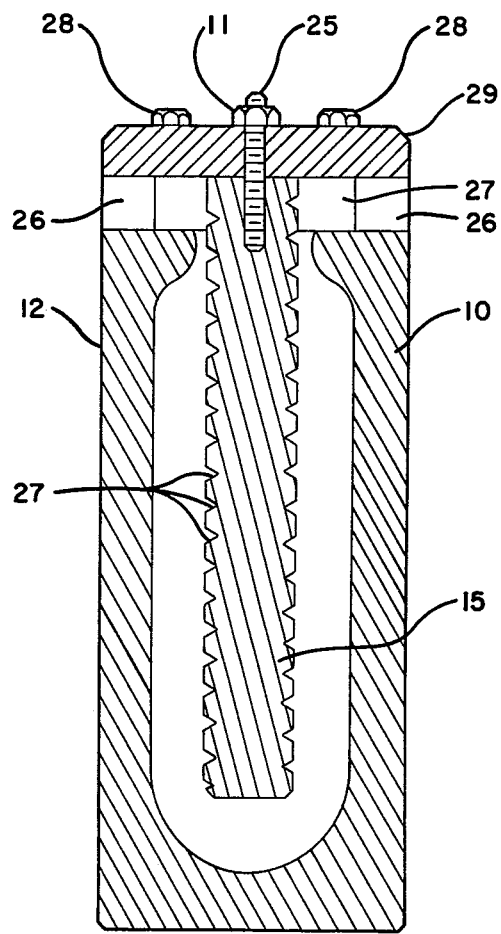
FIG. 1 shows longitudinal cross-sectional view through the mandrel mold.

Referring to the drawing in greater detail FIG. 1 illustrates split mandrel mold 12 which has positioned therein a mandrel core of aluminum or other light weight metal core 15. The exterior surface of mandrel 15 has a plurality of grooves 27 for forming a serrated surface on the external surface of core 15. A stud 25 is threaded into one end of mandrel core 15 and extends through mold cap 29. This arrangement holds core 15 securely in position within split mold assembly indicated as 12. Stud 25 has a nut 11 to hold mandrel 15 to mold cap 29. An overflow chamber 27 is provided adjacent cap 29 for allowing excess mold material to flow through leveling holes 26 which extend through the walls of mold 12. Bolts 28 are used to hold split mold 12 together when assembled. Bolts 28 are screwed into threaded portions in mold element 10 which are not shown. Additional fastening means to hold the base of mold 12 together when assembled are not shown but may be any known fastening means such as bolts, straps, etc. to hold the two portions of split mold 10 and 36 in intimate contact when assembled. The space between core 15 and the internal wall of mold 10, which defines the external shape of completed mandral 14, represents the thickness of the amount of low melting alloy cast on the core 15.

In casting mandrel 14, melted metal is poured through an entrance, not shown, in cap 29 and allowed to fill interstices between core 15 and the internal walls of mold 10. Excess melted metal will flow through leveling holes 26 thus allowing complete filling of mold assembly 12. The melted metal is allowed to solidify and will adhere tightly to core 15 being held thereon by means of serrations 27. Mold 12 is dissassembled and a cast mandrel is obtained that has an exterior surface area that will be the internal surface shape of the desired molded article.

Figure 2:
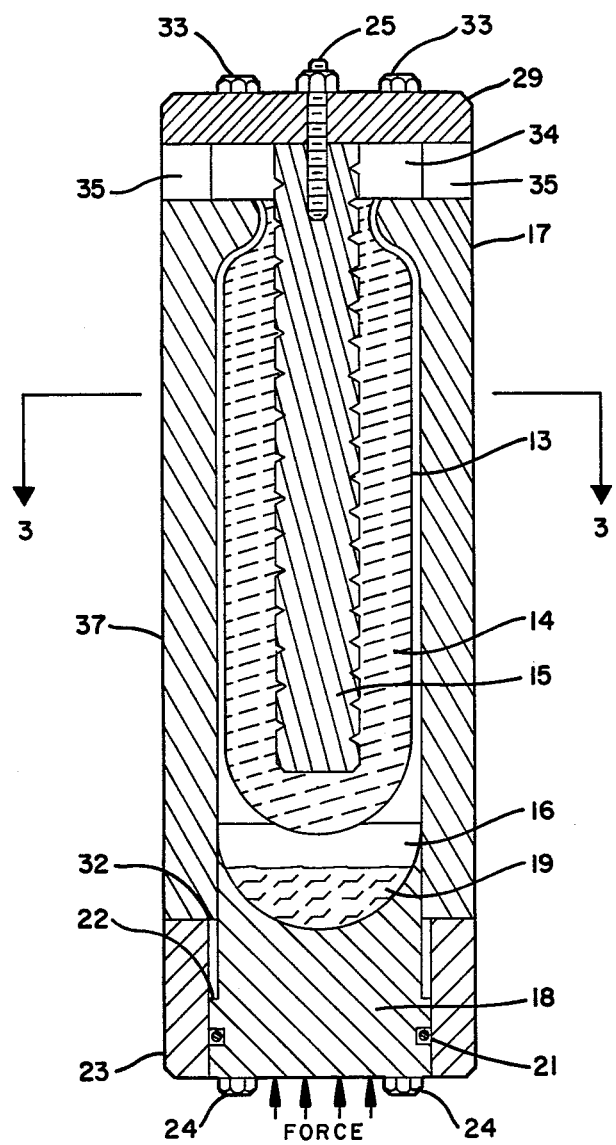
FIG. 2 is a longitudinal section through the assembled mold for casting a device for carrying out the method according to the invention.

The completed mandrel is assembled into split liner casting mold 17, this best being shown by reference to FIG. 2. The cap 29 having the mandrel attached by means of stud 25 is assembled within mold 17 by means of cap bolts 33 into threaded portions of the mold, not shown. These bolts 33 hold the mandrel in a spaced relationship within mold 17. The space between mandrel and wall will represent the wall thickness at 13 of the finished molded liner. Casting mold 17 has an over flow chamber 34 and leveling holes 35 similar to the mandrel mold structure shown in FIG. 1.

The end of mold 17, best shown by reference to FIG. 2, has a cylindrical ring 23 attached thereto by fastening means, not shown, to form a piston chamber. Expulsion piston 18 having a stepped cylindrical outer surface is formed so that its smaller diameter surface will fit in intimate contact with interwall surface of casting mold wall 17. The larger diameter of piston 18 is in intimate contact with the interior wall surface of cylindrical ring 23. Piston 18 is permitted to travel along the longitudinal axis of casting mold 17 a distance defined by shoulder 32 formed by the end of casting mold 17 and cylindrical ring 23 in its forward most postion. This postion is reached when shoulder 22 and shoulder 32 engage. Additional sealing means is provided between piston 18 and interior surface of ring 23 by O ring 21. Bolts 24 are threaded into the casting mold 17 and form additional means to guide piston 18 within cylindrical ring 23.

The face of piston 18 has a cuplike depression forming a reservoir to hold fluid castable material 19. Piston 18 in its fully retracted postion causes a cavity chamber 16 to exist between the surface of castable insulative material 19 and the domelike surface of the end of the mandrel.

Figure 3:
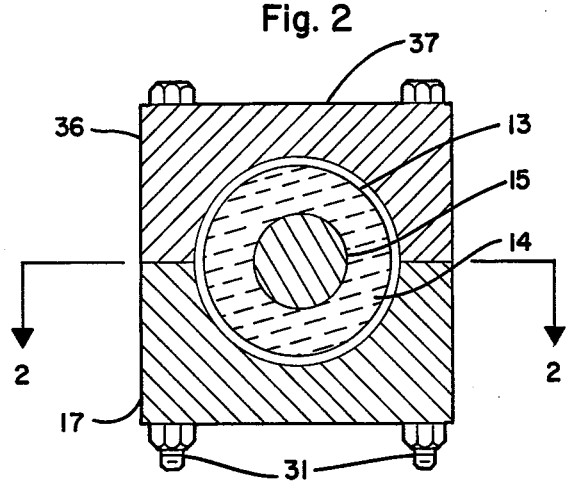
FIG. 3 shows a section of the assembled mold taken on the line 3—3 of FIG. 2 looking in the direction of the arrows.

The completed assembled mold best shown with reference to FIG. 3 has the two mold members 17 and 36 held in intimate contact by means of suitable fastening means such as bolts and nuts 31. The core 15 of mandrel having wall thickness 14 is held in spaced relationship to interior walls of mold 17 and 36 to form space 13 representing wall thickness of the liner to be molded. Piston 18 is removable from the end of assembled mold 37 by removing cap bolts 24.

In molding a structure with wall thickness 13 having an internal shape as defined by the outer surface of low melting alloy 14 and with an external surface as defined by interior walls of mold members 17 and 36, the piston 18 is removed from the end of mold assembly 37 and a castable fluid insulative material 19 is placed in the cup-like depression. Piston 18 with material 19 is placed in vacuum degassing chamber and material 19 is degassed to remove any air bubbles held in suspension within the material 19. The piston 18 is removed from the degassing chamber, not shown, and assembled in cylindrical ring 23 in slidable engagement with the interior walls at the ends of mold members 17 and 36. Guide bolts 24 are inserted to hold piston in place in its fully retracted position so as to keep the surface of material 19 from engaging dome surface of alloy material 14. An external force shown by arrows is applied at the external end of piston 18 to cause piston 18 to travel along the longitudinal axis of assembled mold 37 until shoulders 22 and 32 engage each other. During piston travel material 19 will be forced through interstices defined by 13 and excess material will be forced out into overflow chamber 34 to flow out of mold 37 by means of overflow holes 35. Piston 18 is held against shoulder 32 by retaining force against piston 18 until insulative material 19 has cured. This may be accomplished by tightening bolts 24 or by holding the force applied to piston 18 a sufficient time for curing. After sufficient time is allowed to cure material 19 the entire mold assembly 37 is placed in an oven or subjected to other known heating processes and the temperature is raised a sufficient amount to melt the low melting alloy. The mandrel material will melt and flow through overflow holes 35 thus removing substantially all of the low melting alloy from within the molded article. The mold 37 is disassembled by removal of bolts 33,31, 24 and piston 18 to permit the complete molded article to be removed.

Although the preferred embodiment has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

What is claimed is:

1. A method of making a molded, contoured seamless structure comprising the steps of:
    forming an integral male mold member by casting a low melting alloy around a high melting alloy core to form an external surface area that defines the internal shape of said structure;
    fabricating a female mold member whose internal surface defines an external surface area of said structure, said female mold member having a removable reservoir formed with a cuplike depression at one end of said female member and overflow holes at its other end;
    assembling said male and female members together to form a mold assembly with a spaced distance from one another to define the wall thickness of said structure;
    placing a fluid curable, castable material in said removable reservoir; attaching said removable reservoir to the end of said female mold member;
    applying a force to move said removable reservoir along the longitudinal axis of said mold assembly to cause said fluid castable material to flow into interstices between said male and female members with excess fluid castable material flowing out said overflow holes; allowing said material to cure;
    supplying heat to said mold assembly until a substantial amount of said low melting alloy melts to allow loosening of said structure thus permitting removal of said high melting alloy core; and
    disassemblying said mold assembly to remove said structure.

2. The method of claim 1 wherein the applying of force to movable piston operation includes the steps of:
    holding said removable reservoir in an extended position to maintain pressure on said fluid plastic material until all interstices are filled uniformily;
    maintaining pressure on said fluid plastic material until cured by solidifying.

3. The method of claim 1 further characterized in that said fluid plastic material is a high temperature insulative substance.

* * * * *